(12) United States Patent
Ragab et al.

(10) Patent No.: US 11,159,677 B1
(45) Date of Patent: Oct. 26, 2021

(54) CALL STATUS EFFECTS

(71) Applicant: Facebook, Inc., Menlo Park, CA (US)

(72) Inventors: Ahmed Ragab, Bothell, WA (US); Eve Rallo, Bellevue, WA (US); Joshua Selbo, Bellevue, WA (US); Sarah Morris, Seattle, WA (US); Caitlin Holliday, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 63 days.

(21) Appl. No.: 16/670,942

(22) Filed: Oct. 31, 2019

(51) Int. Cl.
*H04M 3/42* (2006.01)
*G06N 20/00* (2019.01)

(52) U.S. Cl.
CPC ........ *H04M 3/42374* (2013.01); *G06N 20/00* (2019.01); *H04M 3/4217* (2013.01); *H04M 3/4228* (2013.01)

(58) Field of Classification Search
CPC ........... H04M 3/42374; H04M 3/4217; H04M 3/4228; G06N 20/00
USPC .......................... 379/201.01, 265.01–265.14, 379/266.01–266.1, 309, 142.06
See application file for complete search history.

(56) References Cited

U.S. PATENT DOCUMENTS

| | | | |
|---|---|---|---|
| 2010/0080378 A1* | 4/2010 | Katz | H04M 3/5191 379/265.14 |
| 2014/0095627 A1* | 4/2014 | Romagnino | H04L 51/043 709/206 |
| 2014/0108668 A1* | 4/2014 | Zhang | H04W 76/10 709/228 |
| 2014/0120859 A1* | 5/2014 | Ekici | H04W 4/90 455/404.1 |
| 2015/0215579 A1* | 7/2015 | Wang | H04N 7/147 348/14.11 |
| 2016/0364888 A1* | 12/2016 | Jeon | G09G 3/2003 |
| 2017/0006147 A1* | 1/2017 | Plumb | H04M 1/724 |
| 2018/0146086 A1* | 5/2018 | Lantz | H04W 4/029 |
| 2018/0198920 A1* | 7/2018 | Kahn | H04M 3/42059 |
| 2019/0043019 A1* | 2/2019 | Malley | G06Q 10/1095 |
| 2020/0084316 A1* | 3/2020 | Jacob | H04M 3/5175 |
| 2020/0162602 A1* | 5/2020 | Rakshit | H04M 7/0033 |

* cited by examiner

*Primary Examiner* — William J Deane, Jr.
(74) *Attorney, Agent, or Firm* — Lee & Hayes, P.C.

(57) ABSTRACT

Techniques are described that update a caller on call progress status using various effects based on a likelihood that the call will connect with the callee, and/or a likelihood that the caller will prematurely terminate the call. In some examples, a machine-learned model may determine a likelihood that a call will connect based on conditions associated with the callee. In some cases, a machine-learned model may determine a likelihood that a call will be prematurely terminated by the caller based on conditions associated with the caller. Animations, haptic outputs, sounds, and/or other content may be used to indicate likelihood of the call connecting to the caller.

20 Claims, 8 Drawing Sheets

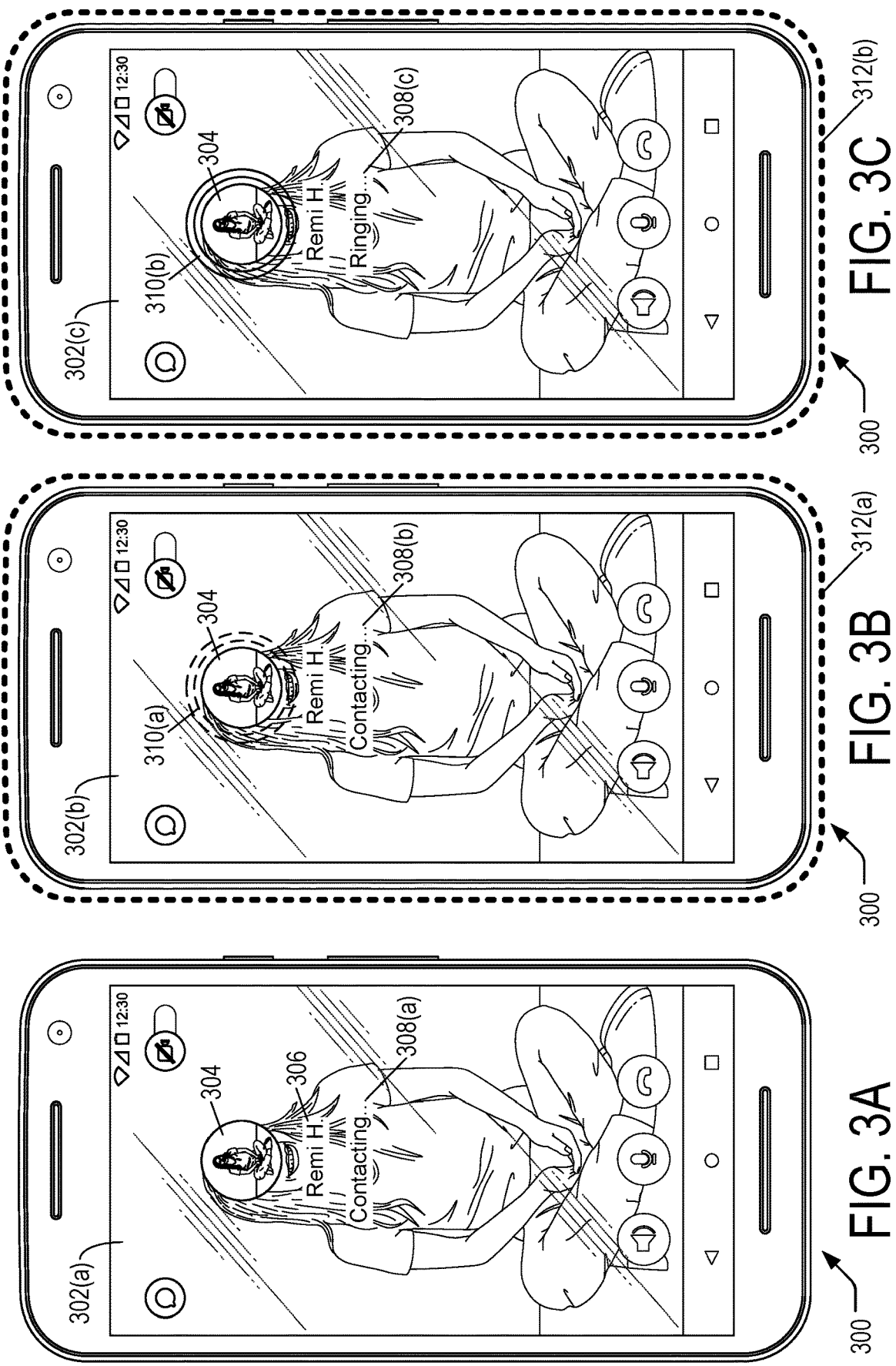

CALL STATUS EFFECTS

BACKGROUND

The number of ways that people can interact with one another continues to increase, especially with new types of computing devices, new communication platforms, and improvements to such. Many digital communication platforms, for instance, enable users to call one another (e.g., by voice calling and/or video calling). The process of setting up a call between users may involve multiple steps. In some cases, callers may terminate a call prior to the call being connected, which may cause a negative experience for the callee and the caller, along with frustration with the communication platform used to initiate the call.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 3A-3E illustrate example interfaces usable to present call status effects in accordance with the described techniques.

DETAILED DESCRIPTION

Figure 1:
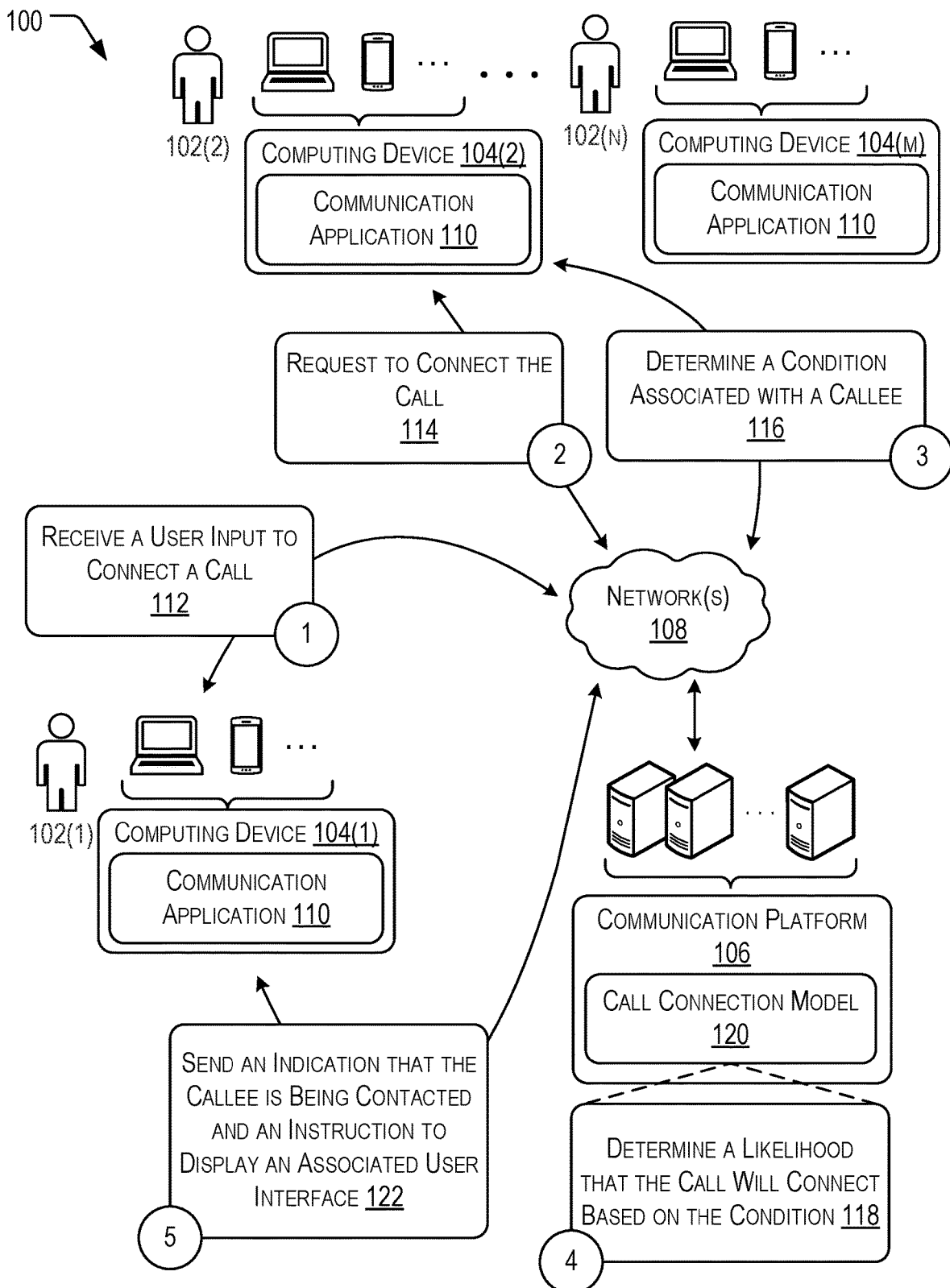
FIG. 1 is a schematic view of an example system for outputting call status effects based on a condition associated with the callee and usable to implement example techniques described herein.

As discussed above, a caller may terminate a call before the call has been connected with a callee, causing a negative experience for both the caller and callee, and a negative perception of the device and/or communication platform used to initiate the call. For example, in some cases, the connection time to connect to the callee may take longer than the caller is willing to wait, and thus the caller may hang up prematurely. In some examples, the caller may notice that the connection time is taking longer than anticipated, and think that progress in establishing the call is not advancing, when in fact the call is still progressing towards connection. Further, different callers may have different time thresholds that they are willing to wait for some indication of the call connection process progressing, with some callers hanging up sooner than others without some progress indication. Premature hang-ups by the caller before a call connection is complete leads to negative experiences and frustration for both the caller and the callee.

For instance, the caller may assume that the calling functionality of the communication platform is inadequate, and seek another communication platform to use. Additionally, the caller and the callee may experience frustration with the communication platform when unable to connect a call. Previous techniques for providing callers with call progress status have been inadequate, as they may not differentiate between a call that is likely to be connected but is possibly taking longer than average versus a call that is not likely to connect. Further, previous techniques for providing callers with call progress status do not customize the progress status updates based on a likelihood that the caller will prematurely terminate the call. This application provides techniques for updating a caller about call progress status using various effects based on a likelihood that the call will connect with the callee, and/or a likelihood that the caller will prematurely terminate the call.

For instance, in one example, a communication platform may provide a one or more different forms of communication for users to interact with one another, such as, but not limited to, voice calling, video calling, instant messaging, text messaging, direct messaging, sharing content (e.g., posting photos, videos, status updates, ephemeral sharing, and the like), and so forth. In some examples, the communication platform may access information which may indicate a presence of a user, such as whether a communication application on a user device associated with the communication platform is active, how long since a user interacted with the communication application, whether the user device is powered on or off, and so on.

In examples, the communication platform may analyze one or more conditions associated with a callee to determine a likelihood that the call will connect, and notify the caller accordingly. For instance, the communication platform may receive a request to connect a call from a first user account (e.g., the "caller") to a second user account (e.g., the "callee"). The communication platform may route the request to connect the call to the second user account. In some examples, the communication platform may detect a condition associated with the second user account, such as a number of active sessions that the second user account has that are associated with the communication platform, whether the second user account has a push token enabled for the communication platform, a likelihood that a user associated with the second user account is online, an amount of time since an interaction was received from the second user account with the communication platform, and so forth. As noted above, one or more of these conditions may be accessed by the communication platform, such as by storing a condition at the communication platform (e.g., whether the second user account has push tokens enabled) or detected upon receipt of the call request (e.g., an amount of time since an interaction was received from the second user account with the communication platform), to name a few examples.

The communication platform, in some examples, may input the condition associated with the second user account into a machine-learned model trained to determine likelihoods of call connections. For instance, the machine-learned model may comprise a boosted decision tree configured to determine the likelihoods of the call connections based on one or more conditions associated with a callee user account. The machine-learned model may output a likelihood that the call will connect with the second user account, based at least in part on the condition associated with the second user account. For instance, if the second user account has two active sessions associated with the communication platform (e.g., one active session on a mobile device and one active session on a laptop computing device), the machine-learned model may output a relatively high likelihood (e.g., 90%, 95%, 99%, etc.) that the call will be connected to the second user account.

In some examples, the communication platform may compare the likelihood that the call will connect with the second user account to a threshold likelihood that the call will connect with the second user account. Any suitable threshold likelihood may be used (e.g., greater than 50%, 75%, 95%, etc.). If the likelihood received from the machine-learned model is greater than the threshold likelihood, the communication platform may send an indication that the second user account is being contacted to the first client device associated with the first user account (in other words, the caller's device). Additionally, in some cases, the communication platform may send an instruction to display a user interface and/or output an effect associated with contacting the second user account, along with the indication that the second user account is being contacted. The instruction may include one or more of an instruction to display an animation in a user interface, an instruction to output a sound, and/or an instruction to output a haptic effect, to name a few examples. By displaying the user interface and/or outputting the effect when the communication platform determines that the likelihood of call connection is greater than a threshold, the caller is given an indication that progress of the call is advancing, thus reducing the likelihood that the caller will prematurely terminate the call.

However, in some examples, if the likelihood received from the machine-learned model is less than the threshold likelihood, the communication platform may send an indication that the second user account is unlikely to be contacted to the first client device. In this case, the communication platform may send an instruction to display a user interface and/or output an effect associated with a low likelihood of call connection with the second user account, thus giving the caller an opportunity to cancel and retry the call. In some examples, the user interface, and/or effect associated with the low likelihood of call connection with the second user account may be different than the user interface and/or effect associated with the likelihood being greater than the threshold. Alternatively or additionally, the communication platform may cancel the attempt to connect the call with the second user account if the likelihood received from the machine-learned model is less than the threshold likelihood.

In some examples, the communication platform may analyze one or more conditions associated with a caller to determine a likelihood that the caller will prematurely terminate the call, and output effects to prevent the caller from prematurely terminating the call that are tailored to the specific caller. For instance, similar to the discussion above, the communication platform may receive a request from a first user account (e.g., the caller) to connect a call to a second user account (e.g., the callee), and forward the request to connect the call on to the second user account. In examples, the communication platform may detect a condition associated with the caller, such as a number of calls that the first user account has prematurely terminated, an elapsed time after initiating calls that the first user account prematurely terminated the calls, and so forth.

The communication platform may input one or more conditions associated with the first user account into a machine-learned model trained to determine likelihoods of call terminations. In examples, the machine-learned model may comprise a boosted decision tree configured to determine the likelihoods of premature call terminations based on one or more conditions associated with a caller user account. The communication platform may receive a likelihood that the first user account will terminate the call before the call is connected from the machine-learned model. In some examples, the communication platform may determine that the likelihood is greater than a threshold likelihood that the first user account will terminate the call before the call is connected (e.g., greater than 10%, 50%, 90%, etc.).

Based on determining that the likelihood is greater than the threshold, the communication platform may send an instruction to display a user interface and/or output an effect associated with progress in contacting the second user account to a computing device associated with the first user account (in other words, the caller's device). The instruction may include one or more of an instruction to display an animation in a user interface, an instruction to output a sound, and/or an instruction to output a haptic effect, to name a few examples. By displaying the user interface and/or outputting the effect when the communication platform determines that the likelihood of the caller prematurely terminating the call is greater than a threshold, different strategies (e.g., in the form of animations and effects) can be used to prevent the caller from prematurely terminating the call and staying on the line until the call is connected. However, in some examples, if the likelihood received from the machine-learned model is less than the threshold likelihood, the communication platform may send an instruction to the first client device to display call progress in a default manner (e.g., without additional animations, effects, or other content changes). In some examples, the caller and callee analysis may be used together to reduce premature call terminations, however, examples are also considered where one is used without the other.

Various embodiments of the present disclosure include systems, methods, and non-transitory computer-readable media of a system comprising a communication platform. In some examples, a communication platform may receive, from a first user account, a first request to connect a call from the first user account to a second user account. The communication platform may send to the second user account, a second request to connect the call. The communication platform may detect a condition associated with the second user account. The communication platform may input the condition associated with the second user account into a machine-learned model trained to determine likelihoods of call connections. The communication platform may receive, from the machine-learned model, output representing a likelihood that the call will connect with the second user account. The communication platform may determine that the likelihood is greater than a threshold likelihood that the call will connect with the second user account. The communication platform may send, to a first client device associated with the first user account and responsive to the likelihood being greater than the threshold likelihood, an indication that the second user account is being contacted and an instruction to display a user interface associated with contacting the second user account.

In some examples, the instruction is a first instruction and the user interface is a first user interface, and the communication platform further may receive, from the second user account, an acknowledgement that the call can connect to the second user account. The communication platform may send a second instruction to the first user account to cause a first computing device associated with the first user account to display a second user interface that the call is ringing at the second user account. The communication platform may send a third instruction to the second user account to cause a second computing device associated with the second user account to present a ring associated with the call.

In some examples, the machine-learned model comprises a boosted decision tree configured to determine the likelihoods of the call connections based on one or more conditions associated with a callee user account.

In some examples, the instruction to display the user interface comprises an instruction to display an animation associated with contacting the second user account.

In some examples, the instruction is a first instruction, and the communication platform may further send a second instruction to the first client device to output a sound associated with contacting the second user account.

In some examples, the instruction is a first instruction, and the communication platform may further send a second instruction to a computing device associated with the first user account to output a haptic output associated with contacting the second user account.

In some examples, the condition comprises at least one of: a number of active sessions of the second user account with a communication platform; whether the second user account has a push token enabled for the communication platform; a likelihood that a user associated with the second user account is online; or a time since an interaction was received from the second user account with the communication platform.

In some examples, the communication platform may further weight the condition based at least in part on how strongly the condition correlates to the likelihood that the call will connect with the second user account.

In some examples, a communication platform may receive, from a first user account, a first request to connect a call from the first user account to a second user account. The communication platform may send, to the second user account, a second request to connect the call. The communication platform may detect a condition associated with the first user account. The communication platform may input the condition associated with the first user account into a machine-learned model trained to determine likelihoods of call terminations. The communication platform may receive, from the machine-learned model, a likelihood that the first user account will terminate the call before the call is connected. The communication platform may determine that the likelihood is greater than a threshold likelihood that the first user account will terminate the call before the call is connected. The communication platform may send, to a computing device associated with the first user account and responsive to the likelihood being greater than the threshold likelihood, an instruction to display a user interface associated with progress in contacting the second user account.

In some examples, the condition comprises a number of calls that the first user account has prematurely terminated or an elapsed time after initiating calls that the first user account prematurely terminated the calls.

In some examples, the threshold likelihood is a first threshold likelihood, and wherein content included in the user interface associated with the progress in contacting the second user account is based at least in part on determining that there is at least a second threshold likelihood that the call will be connected to the second user account.

In some examples, the instruction to display the user interface comprises an instruction to display an animation associated with the progress in contacting the second user account.

In some examples, the instruction is a first instruction, and the communication platform further sends a second instruction to the computing device associated with the first user account to output a sound associated with the progress in contacting the second user account.

In some examples, the instruction is a first instruction, and the communication platform further sends a second instruction to the computing device associated with the first user account to output a haptic output associated with the progress in contacting the second user account.

In some examples, the communication platform determines that a likelihood that the call will be connected is less than the second threshold likelihood that the call will be connected, and the content included in the user interface comprises an indication that the call is unlikely to connect to the second user account.

In some examples, the communication platform determines that a likelihood that the call will be connected is greater than the second threshold likelihood that the call will be connected, and the content included in the user interface comprises an indication that the call is likely to connect to the second user account.

In addition to the societal improvements discussed above, the techniques described herein also improve performance of one or more computing devices by reducing an amount of content sent over a network. For instance, by sending instructions to caller devices that indicate call progress, fewer calls are prematurely terminated and retried, thus the communication platform can reduce the number of repeated attempted call connections. In this way, the quantity of data sent over the network may be reduced.

These and other aspects are described further below with reference to the accompanying drawings. The drawings are merely example implementations and should not be construed to limit the scope of the claims. For example, while examples are illustrated in the context of a user interface for a mobile device, the techniques may be implemented using any computing device and the user interface may be adapted to the size, shape, and configuration of the particular computing device.

Example System Architecture

FIG. 1 is a schematic view of an example computing system 100 usable to implement example techniques described herein to provide effects corresponding to call status using a communication platform via the system 100. In some examples, the system 100 may include users 102(1), 102(2), . . . 102(n) (collectively "users 102") to interact using computing devices 104(1), 104(2), . . . 104(m) (collectively "computing devices 104") with a communication platform 106 via a network 108. In this example, n and m are non-zero integers greater than 1.

Each of the computing devices 104 includes one or more processors and memory storing computer executable instructions to implement the functionality discussed herein attributable to the various computing devices. In some examples, the computing devices 104 may include desktop computers, laptop computers, tablet computers, mobile devices (e.g., smart phones or other cellular or mobile phones, mobile gaming devices, portable media devices, etc.), or other suitable computing devices. The computing devices 104 may execute one or more client applications, such as a web browser (e.g., Microsoft Windows Internet Explorer, Mozilla Firefox, Apple Safari, Google Chrome, Opera, etc.) or a native or special-purpose client application (e.g., communication applications, social media applications, messaging applications, email applications, games, etc.), to access and view content over the network 108.

The network 108 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the computing devices 104 may access the communication platform 106 and/or communicate with one another.

The communication platform 106 may include one or more servers or other computing devices, any or all of which may include one or more processors and memory storing computer executable instructions to implement the functionality discussed herein attributable to the communication platform. The communication platform 106 may enable its users 102 (such as persons or organizations) to interact with the communication platform 106 and with each other via the computing devices 104, such as by way of a communication application 110 stored on the respective computing devices 104. The communication platform 106 may, with input from a user via the communication application 110, create and store in the communication platform 106 a user account associated with the user. The user account may include demographic information, communication-channel information, presence information, and information on personal interests of the user, to name a few examples. The communication platform 106 may also, with input from a user, create and store a record of relationships of the user with other users of the social networking system, as well as provide services (e.g., voice calling, video calling, posts, comments, photo-sharing, messaging, tagging, mentioning of other users or entities, games, etc.) via the communication application 110 to facilitate social interaction between or among the users 102.

As just mentioned, the communication platform 106 may be configured to enable live communication between the users 102, such as in the form of voice calling and/or video calling using the communication application 110 on the computing devices 104. Additionally, in some examples, the communication platform 106 may communicate a progress status of call connections from one of the computing devices 104(1) to another one (or more) of the computing devices 104(2)-104(m), such as via the network 108. Further, in some cases, the communication platform 106 may send instructions to one or more of the computing devices 104 to output call status effects corresponding to the status of the call connection, as described herein.

For example, at operation 112 (indicated by "1"), the communication application 110 of the computing device 104(1) may receive a user input to connect a call to one or more user accounts associated with the other computing devices 104(2)-104(m). In some examples, communication application 110 and the communication platform 106 may operate as a social network service (e.g., WhatsApp®, Facebook®, etc.), although other examples of services are also considered. The user input indicating a request to connect the call may be communicated from the communication application 110 of the computing device 104(1) to the communication platform 106. The communication platform 106 may identify which of the user accounts associated with the respective computing devices 104(2)-104(m) that the request indicates to connect the call.

At operation 114 (indicated by "2"), the communication platform 106 may request to connect the call to the user account associated with the computing device 104(2), as indicated by the user input received at the computing device 104(1). In some examples, after receiving the user input, the computing device 104(1) may present a user interface on a display of the computing device 104(1) and/or output an effect (e.g., a sound, a haptic output, etc.) indicating that the request to connect the call has been sent to the communication platform 106. For instance, the computing device 104(1) may display a user interface with the word "Contacting" and text or an image related to the user account associated with the user 102(2).

At operation 116 (indicated by "3"), the communication platform 106 may determine a condition associated with a callee (in this case, a user account associated with the computing device 104(2) of the user 102(2)). In some examples, the condition may relate to a likelihood of a presence of the user 102(2) either with the communication application 110 and/or the computing device 104(2), as a presence of the user may increase a likelihood that the call will connect. For instance, if the computing device 104(2) is powered off or in "airplane mode" (e.g., without access to the network 108), then it would be unlikely that the call would connect; if the computing device 104(2) is powered on and connected to the network 108 but the communication application is not open, it would be more likely than the previous case that the call would connect; or if the user 102(2) is actively engaging with the communication application 110 on the computing device 104(2), it would be even more likely than both of the previous two scenarios that the call will connect. A non-limiting list of conditions that may be used to determine a likelihood that the call will connect can be found in the following Table 1:

TABLE 1

| Condition | Description |
| --- | --- |
| number_of_sessions | Number of current open socket connections between callee device(s) and the communication platform 106 |
| max_push_token_prediction | Maximum probability of push token being delivered considering all of callee's tokens |
| min_push_token_prediction | Minimum probability of push token being delivered considering all of callee's tokens |
| number_of_push_tokens | Total number of callee's push tokens accessible by the communication platform 106 |
| idle_seconds | Number of seconds since last communication between callee device(s) and the communication platform 106 |
| active_on_fb | Whether the user 102(2) on one or more applications that share data with the communication platform 106 |
| most_recent_push_token_update_time | Number of seconds elapsed since any of callee's push tokens was updated |
| most_recent_device_update_time | Number of seconds elapsed since any of callee's device was updated (e.g., interacted with) |
| active_on_web | Whether callee is currently active on a web browser interface |
| active_on_messenger | Whether the callee is currently active on a messenger application |

In some examples, the communication platform 106 may track statistical behavior of one or more of the users 102 regarding semantics of a prediction of whether a call will connect. For example, the communication platform 106 may determine false and true positives and/or negatives for a specific user of the users 102 within different time frames (e.g., last hour, day, week, etc.). In some cases, the communication platform 106 may use conditions for a specific user of the users 102 for a specific time of day, day of the week, day of the month, and so forth. A non-limiting list of conditions that may be used to determine a likelihood that the call will connect based on a specific callee can be found in the following Table 2:

TABLE 2

| Condition |
| --- |
| user_id_counter_l28_ctr |
| user_id_counter_total_last_updated_seconds_ago |
| user_id_counter__positive_last_updated__day_of_week |
| user_id_counter__week__ctr |
| user_id_counter__positive_last_updated__hour_of_day |
| user_id_counter__positive_last_updated__seconds_ago |
| user_id_x_hour_in_day_x_day_of_week_counter__total_last_updated__hour_of_day |
| user_id_counter__l28__total |
| user_id_counter__week__total |
| user_id_counter__total_last_updated__hour_of_day |
| user_id_counter__day__total |
| user_id_counter__hour__total |
| user_id_counter__day__ctr |
| user_id_x_hour_in_day_x_day_of_week_counter__l28__positives |
| user_id_x_hour_in_day_x_day_of_week_counter__week__total |
| user_id_counter__l28__positives |
| user_id_x_hour_in_day_x_day_of_week_counter__positive_last_updated__seconds_ago |
| user_id_x_hour_in_day_x_day_of_week_counter__l28__ctr |
| user_id_x_hour_in_day_x_day_of_week_counter__day__total |
| user_id_counter__week__positives |
| user_id_x_hour_in_day_x_day_of_week_counter__week__ctr |
| user_id_x_hour_in_day_x_day_of_week_counter__total_last_updated__seconds_ago |
| user_id_counter__day__positives |
| user_id_x_hour_in_day_x_day_of_week_counter__week__positives |
| user_id_x_hour_in_day_x_day_of_week_counter__hour__positives |
| user_id_x_hour_in_day_x_day_of_week_counter__hour__ctr |
| user_id_counter__hour__positives |
| user_id_x_hour_in_day_x_day_of_week_counter__l28__total |
| user_id_x_hour_in_day_x_day_of_week_counter__day__ctr |
| user_id_x_hour_in_day_x_day_of_week_counter__hour__total |
| user_id_counter__total_last_updated__day_of_week |
| user_id_x_hour_in_day_x_day_of_week_counter__positive_last_updated__day_of_week |
| user_id_x_hour_in_day_x_day_of_week_counter__total_last_updated__day_of_week |
| user_id_x_hour_in_day_x_day_of_week_counter__day__positives |

In some examples, a "push notification" may be used to notify user of an event associated with a particular application, such as the communication application 110. A push notification may show up on a lock screen of a user's computing device when the user is not actively engaged with the computing device (e.g., by causing the screen of the computing device to light up and/or display the push notification), and/or may overlay a current application that the user is engaged with on the computing device (e.g., other than the communication application 110). In many cases, a user must give an application permission to activate push notifications on a computing device.

When the user gives the application permission to activate push notifications (e.g., via device settings and/or application settings), a push token may be issued for the specific application/device combination. The push token may allow an application that utilizes push notifications to route messages and ensure that a notification is delivered only to the unique application-device combination for which it is intended. A user may have multiple push tokens depending upon how many devices that the user uses, and how many coordinating applications they have installed on each device. For instance, a user may have coordinating applications such as Facebook®, WhatsApp®, Instagram®, Threads®, and so forth that may each have respective push tokens and/or one or multiple push tokens that are shared between the different applications on the same device.

In some examples, push notifications may be used to deliver a temporarily-displayed message associated with the communication application 110 to a callee about an incoming call offer and/or that a call is ringing. Thus, the communication platform 106 may determine conditions associated with push notifications to determine a likelihood that a call will connect. A non-limiting list of conditions that may be used to determine a likelihood that a push token is capable of delivering a message to the callee can be found in the following Table 3:

TABLE 3

| Condition |
| --- |
| device_update_time |
| token_update_time |
| os_version |
| current_sim_operator |
| app_id |
| os |
| device_type |
| last_connection_type |
| app_version |
| connection_change_time |
| device_blocked |
| device_id_counter__l28__ctr |
| device_id_counter__total_last_updated__day_of_week |
| device_id_counter__positive_last_updated__seconds_ago |
| device_id_counter__week__ctr |
| device_id_counter__positive_last_updated__day_of_week |
| device_id_counter__hour__ctr |
| device_id_counter__total_last_updated__seconds_ago |
| device_id_counter__hour__total |
| device_id_counter__day__ctr |
| device_id_counter__l28__total |
| device_id_counter__positive_last_updated__hour_of_day |
| device_id_counter__hour__positives |
| device_id_counter__day__total |
| device_id_counter__l28__positives |
| device_id_counter__week__total |
| device_id_counter__week__positives |
| device_id_counter__day__positives |
| device_id_counter__total_last_updated__hour_of_day |

At operation 118 (indicated by "4"), the communication platform 106 determines a likelihood that the call will connect based at least in part on the condition. In some examples, the communication platform 106 may include a call connection model 120 that includes one or more machine-learned models trained to determine likelihoods of call connections, such as based on the condition(s) associated with the callee determined in operation 116. For instance, the communication platform 106 may input the condition(s) into the call connection model 120, and receive a likelihood that the call will connect (e.g., a probability that the call will connect) from the call connection model 120. In some examples, the call connection model 120 may comprise a boosted decision tree configured to determine the likelihoods of the call connections based on one or more conditions associated with a callee user account, e.g., a user account associated with the user 102(2).

In some examples, the call connection model 120 (or a portion of the call connection model 120) may determine a likelihood that a push token is capable of delivering a push notification based on one or more of the conditions included in Table 3. In some cases, different conditions may affect the likelihood that a push notification is capable of being delivered in different ways. For instance, the condition for device_update_time (e.g., when the computing device 104(2) last experienced a user interaction) may have a greater effect on whether the user will view the push notification than the condition for app_version (e.g., corresponding to the version of the communication application 110 installed on the computing device 104(2)). Therefore, the call connection model 120 may weight different conditions according to the likelihood that each condition indicates whether the push token is capable of delivering the push notification.

Additionally, in some examples, the call connection model 120 may use one or more of the conditions indicated in Table 1 and/or Table 2 to determine a likelihood that the call will connect. Similar to the discussion above regarding push notifications, different conditions may affect the likelihood that a call will connect in different ways. For instance, the condition for number_of_sessions may have a greater effect on whether the call will connect than the condition for most_recen_device_update_time. Therefore, the call connection model 120 may weight different conditions according to the likelihood that each condition indicates whether the call will be connected or not. The call connection model 120 may output an overall likelihood that the call will connect based on the different conditions input to the call connection model 120, and the weights associated with the respective conditions.

In some examples, the communication platform 106 may compare the likelihood that the call will connect received from the call connection model 120 to a threshold likelihood that the call will connect. Any suitable threshold likelihood may be used (e.g., greater than 50%, 75%, 95%, etc.). If the likelihood that the call will connect received from the call connection model 120 is less than the threshold likelihood, then in some examples, the call may be terminated. Alternatively or additionally, the communication platform 106 may output an instruction to the computing device 104(1) that the call is not likely to connect, allowing the user 102(1) to choose to retry the call again later without waiting unnecessarily for the call to connect, or choose to continue trying to connect the call.

At operation 122 (indicated by "5"), the communication platform 106 may send an indication that the callee is being contacted, along with an instruction to display an associated user interface, to the communication application 110 of the computing device 104(1). In some examples, the instruction to display an associated user interface may provide an indication of call progress, and comprise an instruction to display an animation, change wording in a user interface of the communication application 110, display an image or video, and the like. Alternatively or additionally, the communication platform 106 may send an instruction to the communication application 110 of the computing device 104(1) to output an effect as an indication of call progress, such as a sound effect and/or a haptic effect. The user interface and/or effects may give the user 102(1) an indication that the call is likely to progress, e.g., from a "contacting" stage to a "ringing" stage, despite the contacting stage not yet being completed. Therefore, premature call terminations may be reduced during the contacting stage, improving user experiences with the communication application 110 and the communication platform 106.

In some examples, the communication platform 106 may provide privacy features to the users 102 while interacting with the communication platform 106. In particular examples, one or more objects (e.g., content or other types of objects) of the computing system 100 may be associated with one or more privacy settings. The one or more objects may be stored on or otherwise associated with any suitable computing system or application, such as, for example, the communication platform 106, a client system, a third-party system, a social networking application, a messaging application, a photo-sharing application, or any other suitable computing system or application. Although the examples discussed herein are in the context of an online social network, these privacy settings may be applied to any other suitable computing system. Privacy settings (or "access settings") for an object or item of content may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular examples, privacy settings for an object may specify a "blocked list" and/or a "restricted list" of users or other entities that should not be allowed to access certain information associated with the object. In particular examples, the blocked list may include third-party entities. The blocked list or restricted list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular examples, privacy settings may be based on one or more nodes or edges of a social graph. A privacy setting may be specified for one or more edges or edge-types of the social graph, or with respect to one or more nodes or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a user 102(1) may share an object to the communication platform 106. The object may be associated with a concept node connected to a user node of the user 102(1) by an edge. The user 102(1) may specify privacy settings that apply to a particular edge connecting to the concept node of the object, or may specify privacy settings that apply to all edges connecting to the concept node. In some examples, the user 102(1) may share a set of objects of a particular object-type (e.g., a set of images). The user 102(1) may specify privacy settings with respect to all objects associated with the user 102(1) of that particular object-type as having a particular privacy setting (e.g., specifying that all images posted by the user 102(1) are visible only to friends of the user and/or users tagged in the images).

In particular examples, the communication platform 106 may present a "privacy wizard" (e.g., within a webpage, a module, one or more dialog boxes, or any other suitable interface) to the user 102(1) to assist the user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the communication platform 106 may offer a "dashboard" functionality to the user 102(1) that may display, to the user 102(1), current privacy settings of the user 102(1). The dashboard functionality may be displayed to the user 102(1) at any appropriate time (e.g., following an input from the user 102(1) summoning the dashboard functionality, following the occurrence of a particular event or trigger action). The dashboard functionality may allow the user 102(1) to modify one or more of the user's current privacy settings at any time, in any suitable manner (e.g., redirecting the user 102(1) to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular examples, one or more servers of the communication platform 106 may be authorization/privacy servers for enforcing privacy settings. In response to a request from the user 102(1) (or other entity) for a particular object stored in a data store, the communication platform 106 may send a request to the data store for the object. The request may identify the user 102(1) associated with the request and the object may be sent only to the user 102(1) (or a client system of the user) if the authorization server determines that the user 102(1) is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular examples, an object may represent content that is visible to a user through a newsfeed of the user. As an example and not by way of limitation, one or more objects may be visible to a user's "Trending" page. In particular examples, an object may correspond to a particular user. The object may be content associated with the particular user, or may be the particular user's account or information stored on the communication platform 106, or other computing system. As an example and not by way of limitation, the user 102(1) may view one or more other users 102(2) . . . 102(n) of an online social network through a "People You May Know" function of the online social network, or by viewing a list of friends of the user 102(1). As an example and not by way of limitation, the user 102(1) may specify that they do not wish to see objects associated with a particular other user (e.g., the user 102(2)) in their newsfeed or friends list. If the privacy settings for the object do not allow it to be surfaced to, discovered by, or visible to the user 102(1), the object may be excluded from the search results. Although this disclosure describes enforcing privacy settings in a particular manner, this disclosure contemplates enforcing privacy settings in any suitable manner.

In particular examples, different objects of the same type associated with a user may have different privacy settings. Different types of objects associated with a user may also have different types of privacy settings. As an example and not by way of limitation, the user 102(1) may specify that the user's status updates are public, but any images shared by the user are visible only to the user's friends on the online social network. In some examples, the user 102(1) may specify different privacy settings for different types of entities, such as individual users, friends-of-friends, followers, user groups, or corporate entities. In some examples, the user 102(1) may specify a group of users that may view videos posted by the user 102(1), while keeping the videos from being visible to the user's employer. In particular examples, different privacy settings may be provided for different user groups or user demographics. As an example and not by way of limitation, the user 102(1) may specify that other users who attend the same university as the user 102(1) may view the user's pictures, but that other users who are family members of the user 102(1) may not view those same pictures.

In particular examples, the communication platform 106 may provide one or more default privacy settings for each object of a particular object-type. A privacy setting for an object that is set to a default may be changed by a user associated with that object. As an example and not by way of limitation, all images posted by the user 102(1) may have a default privacy setting of being visible only to friends of the first user and, for a particular image, the user 102(1) may change the privacy setting for the image to be visible to friends and friends-of-friends.

In particular examples, privacy settings may allow the user 102(1) to specify (e.g., by opting out, by not opting in) whether the communication platform 106 may receive, collect, log, or store particular objects or information associated with the user 102(1) for any purpose. In particular examples, privacy settings may allow the user 102(1) to specify whether particular applications or processes may access, store, or use particular objects or information associated with the user. The privacy settings may allow the user 102(1) to opt in or opt out of having objects or information accessed, stored, or used by specific applications or processes. The communication platform 106 may access such information in order to provide a particular function or service to the user 102(1), without the communication platform 106 having access to that information for any other purposes. Before accessing, storing, or using such objects or information, the communication platform 106 may prompt the user 102(1) to provide privacy settings specifying which applications or processes, if any, may access, store, or use the object or information prior to allowing any such action. As an example and not by way of limitation, the user 102(1) may transmit a message to the user 102(2) via an application related to the online social network (e.g., a messaging app), and may specify privacy settings that such messages should not be stored by the communication platform 106.

In particular examples, the user 102(1) may specify whether particular types of objects or information associated with the user 102(1) may be accessed, stored, or used by the communication platform 106. As an example and not by way of limitation, the user 102(1) may specify that images sent by the user 102(1) through the communication platform 106 may not be stored by the communication platform 106. In some examples, the user 102(1) may specify that messages sent from the user 102(1) to another user 102(2) may not be stored by the communication platform 106. In some cases, the user 102(1) may specify that all objects sent via a particular application may be saved by the communication platform 106.

In particular examples, privacy settings may allow the user 102(1) to specify whether particular objects or information associated with the user 102(1) may be accessed from particular client systems or third-party systems. The privacy settings may allow the user 102(1) to opt in or opt out of having objects or information accessed from a particular device (e.g., the phone book on a user's smart phone), from a particular application (e.g., a messaging app), or from a particular system (e.g., an email server). The communication platform 106 may provide default privacy settings with respect to each device, system, or application, and/or the user 102(1) may be prompted to specify a particular privacy setting for each context. As an example and not by way of limitation, the user 102(1) may utilize a location-services feature of the communication platform 106 to provide recommendations for restaurants or other places in proximity to the user 102(1). The default privacy settings of the user 102(1) may specify that the communication platform 106 may use location information provided from the computing device 104(1) of the user 102(1) to provide the location-based services, but that the communication platform 106 may not store the location information of the user 102(1) or provide it to any third-party system. The user 102(1) may then update the privacy settings to allow location information to be used by a third-party image-sharing application in order to geo-tag photos.

In particular examples, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. In some examples, a company may post content related to a product release ahead of the official launch, and specify that the content may not be visible to other users until after the product launch.

In particular examples, for particular objects or information having privacy settings specifying that they are ephemeral, the communication platform 106 may be restricted in its access, storage, or use of the objects or information. The communication platform 106 may temporarily access, store, or use these particular objects or information in order to facilitate particular actions of a user associated with the objects or information, and may subsequently delete the objects or information, as specified by the respective privacy settings. As an example and not by way of limitation, the user 102(1) may transmit a message to the user 102(2), and the communication platform 106 may temporarily store the message in a data store until the user 102(2) has viewed or downloaded the message, at which point the communication platform 106 may delete the message from the data store. In some examples, continuing with the prior example, the message may be stored for a specified period of time (e.g., 2 weeks), after which point the communication platform 106 may delete the message from the data store.

In particular examples, changes to privacy settings may take effect retroactively, affecting the visibility of objects and content shared prior to the change. As an example and not by way of limitation, the user 102(1) may share a first image and specify that the first image is to be public to all other users. At a later time, the user 102(1) may specify that any images shared by the user 102(1) should be made visible only to a first user group. The communication platform 106 may determine that this privacy setting also applies to the first image and make the first image visible only to the first user group. In particular examples, the change in privacy settings may take effect only going forward. Continuing the example above, if the user 102(1) changes privacy settings and then shares a second image, the second image may be visible only to the first user group, but the first image may remain visible to all users. In particular examples, in response to a user action to change a privacy setting, the communication platform 106 may further prompt the user to indicate whether the user wants to apply the changes to the privacy setting retroactively. In particular examples, a user change to privacy settings may be a one-off change specific to one object. In particular examples, a user change to privacy may be a global change for all objects associated with the user.

In particular examples, the communication platform 106 may determine that user 102(1) may want to change one or more privacy settings in response to a trigger action associated with the user 102(1). The trigger action may be any suitable action on the online social network. As an example and not by way of limitation, a trigger action may be a change in the relationship between a first and second user of the online social network (e.g., "un-friending" a user, changing the relationship status between the users, etc.). In particular examples, upon determining that a trigger action has occurred, the communication platform 106 may prompt the user 102(1) to change the privacy settings regarding the visibility of objects associated with the user 102(1). The prompt may redirect the user 102(1) to a workflow process for editing privacy settings with respect to one or more entities associated with the trigger action. The privacy settings associated with the user 102(1) may be changed only in response to an explicit input from the user 102(1), and may not be changed without the approval of the user 102(1). As an example and not by way of limitation, the workflow process may include providing the user 102(1) with the current privacy settings with respect to the user 102(2) or to a group of users (e.g., un-tagging the user 102(1) or the user 102(2) from particular objects, changing the visibility of particular objects with respect to the user 102(2) or a group of users), and receiving an indication from the user 102(1) to change the privacy settings based on any of the methods described herein, or to keep the existing privacy settings.

In particular examples, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the communication platform 106 may determine that such action may be sensitive and may prompt the user to confirm that his or her relationship status should remain public before proceeding. In some examples, a user's privacy settings may specify that the user's posts are visible only to friends of the user. However, if the user changes the privacy setting for his or her posts to being public, the communication platform 106 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular examples, a user may need to provide verification of a privacy setting on a periodic basis. A prompt or reminder may be periodically sent to the user based either on time elapsed or a number of user actions. As an example and not by way of limitation, the communication platform 106 may send a reminder to the user to confirm his or her privacy settings every six months or after every ten photo posts. In particular examples, privacy settings may also allow users to control access to the objects or information on a per-request basis. As an example and not by way of limitation, the communication platform 106 may notify the user whenever a third-party system attempts to access information associated with the user, and require the user to provide verification that access should be allowed before proceeding. Although generally described in relation to the system 100, the privacy settings and description above may apply to the system 200 and/or any system or technique described herein.

Figure 2:
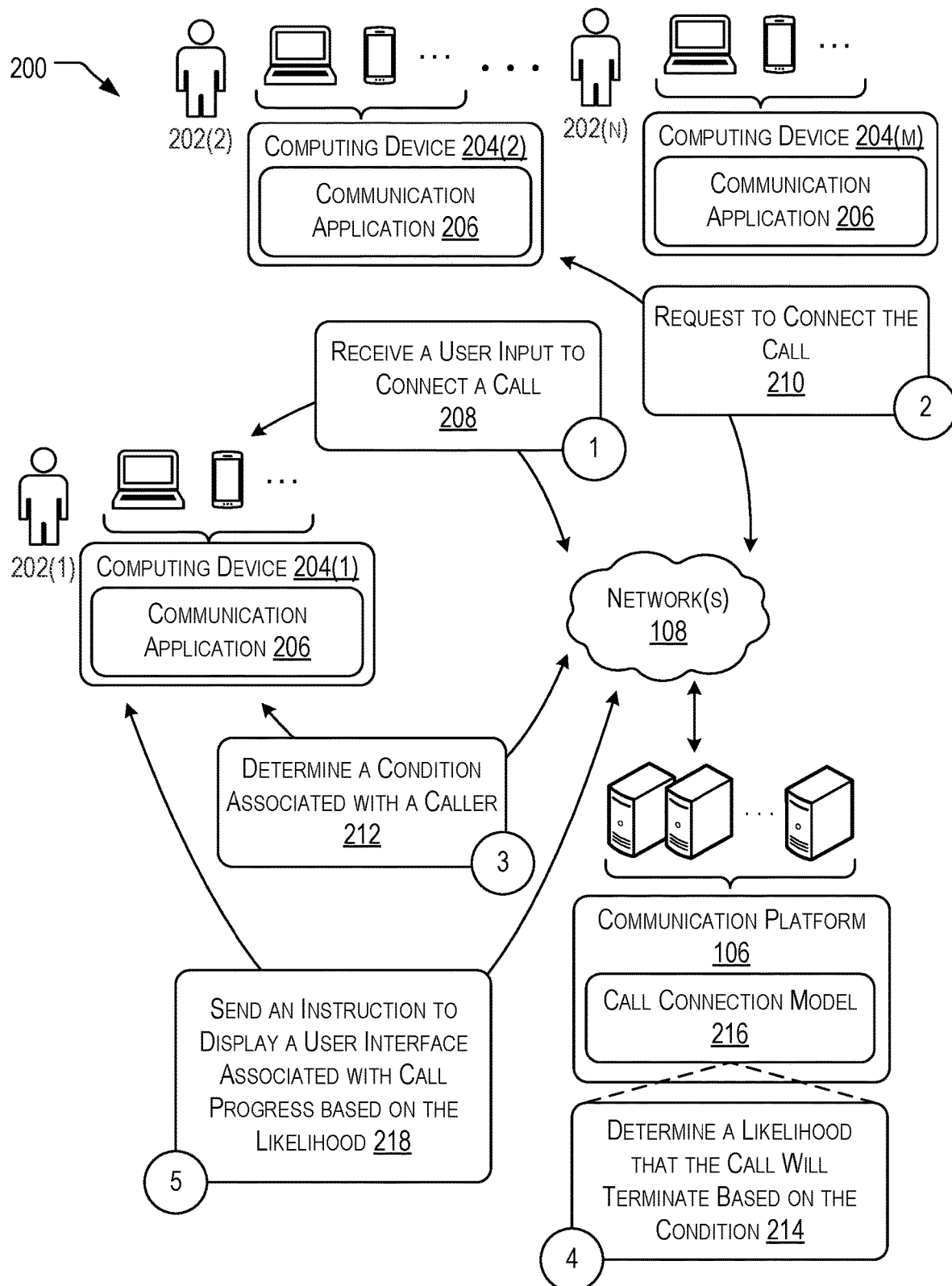
FIG. 2 is a schematic view of an example system for outputting call status effects based on a condition associated with the caller and usable to implement example techniques described herein.

FIG. 2 is a schematic view of an example system 200 for outputting call status effects based on a condition associated with the caller and usable to implement example techniques described herein. In some examples, the system 200 may include users 202(1), 202(2), . . . 202(n) (collectively "users 202") to interact using computing devices 204(1), 204(2), . . . 204(m) (collectively "computing devices 204") with the communication platform 106 via the network 108. In this example, n and m are non-zero integers greater than 1 The computing devices 204 may have features and functionality similar to the computing devices 104 of FIG. 1. Additionally, the communication platform 106 and the network 108 may have features and functionality similar to the descriptions of these components described in relation to FIG. 1. The computing devices 204 may store a communication application 206, which may have features and/or functionality similar to the communication application 110 of FIG. 1.

In some examples, the communication platform 106 may be configured to enable live communication between the users 202, such as in the form of voice calling and/or video calling using the communication application 206 on the computing devices 204. Additionally, in some examples, the communication platform 106 may communicate a progress status of call connections from one of the computing devices 204(1) to another one (or more) of the computing devices 204(2)-204(m), such as via the network 108. Further, in some cases, the communication platform 106 may send instructions to one or more of the computing devices 204 to output call status effects corresponding to the status of the call connection and based on a likelihood of premature call termination, as described herein.

For example, at operation 208 (indicated by "1"), the communication application 206 of the of the computing device 204(1) may receive a user input to connect a call to one or more user accounts associated with the other computing devices 104(2)-104(m). In some examples, communication application 206 and the communication platform 106 may operate as a social network service (e.g., WhatsApp®, Facebook®, etc.), although other examples of services are also considered. The user input indicating a request to connect the call may be communicated from the communication application 206 of the computing device 204(1) to the communication platform 106. The communication platform 106 may identify which of the user accounts associated with the respective computing devices 204(2)-204(m) that the request indicates to connect the call.

At operation 210 (indicated by "2"), the communication platform 106 may request to connect the call to the user account associated with the computing device 204(2), as indicated by the user input received at the computing device 204(1). In some examples, after receiving the user input, the computing device 204(1) may present a user interface on a display of the computing device 204(1) and/or output an effect (e.g., a sound, a haptic output, etc.) indicating that the request to connect the call has been sent to the communication platform 106. For instance, the computing device 204(1) may display a user interface with the word "Contacting" and text or an image related to the user account associated with the user 202(2).

At operation 212 (indicated by "3"), the communication platform 106 may determine a condition associated with a caller (in this case, a user account associated with the computing device 204(1) of the user 202(1)). In some examples, the condition may relate to a likelihood of that the user 202(1) will prematurely terminate the call. That is, the condition may relate to a likelihood that the user 202(1) will hang up while the call is contacting the user 202(2) and before the call transitions to ringing at both the computing device 204(1) and 204(2). In some examples, prematurely terminating the call may occur at other stages of the call, such as when the call is ringing. In some examples, the condition may include a number of calls that the user account of the user 202(1) has prematurely terminated, an elapsed time after initiating calls that the user account of the user 202(1) prematurely terminated the calls, and so forth.

At operation 214 (indicated by "4"), the communication platform 106 determines a likelihood that the call will terminate based on the condition. In some examples, the communication platform 106 may include a call connection model 216 that includes one or more machine-learned models trained to determine likelihoods of call terminations, such as based on the condition(s) associated with the caller determined in operation 212. For instance, the communication platform 106 may input the condition(s) into the call connection model 216, and receive a likelihood that the caller will prematurely terminate the call (e.g., a probability that the caller will prematurely terminate the call) from the call connection model 216. In some examples, the call connection model 216 may comprise a boosted decision tree configured to determine the likelihoods of the call terminations by the caller based on one or more conditions associated with a caller user account, e.g., a user account associated with the user 202(1).

In some examples, the call connection model 216 may weight different conditions according to the likelihood that each condition indicates whether the call will be prematurely terminated by the caller or not. The call connection model 216 may output an overall likelihood that the call will be prematurely terminated by the caller based on the different conditions input to the call connection model 216, and the weights associated with the respective conditions.

In some examples, the communication platform 106 may compare the likelihood that the call will be prematurely terminated by the caller received from the call connection model 216 to a threshold likelihood that the call will be prematurely terminated by the caller. Any suitable threshold likelihood may be used (e.g., greater than 10%, 50%, 90%, etc.). If the likelihood that the call will be prematurely terminated by the caller received from the call connection model 216 is less than the threshold likelihood, then in some examples the call progress may be output by the computing device 204(1) according to a default process. Alternatively or additionally, the communication platform 106 may output an instruction to the computing device 104(1) to display a user interface and/or output an effect based on a likelihood that the call will connect, according to the description of FIG. 1.

At operation 218 (indicated by "5"), the communication platform 106 may send an instruction to the communication application 206 of the computing device 104(1) to display a user interface and/or output an effect associated with call progress based on the likelihood that the user 202(1) is going to prematurely terminate the call. In some examples, the instruction to display an associated user interface may provide an indication of call progress, and comprise an instruction to display an animation, change wording in a user interface of the communication application 206, display an image or video, and the like. Alternatively or additionally, the communication platform 106 may send an instruction to the communication application 206 of the computing device 104(1) to output an effect as an indication of call progress, such as a sound effect and/or a haptic effect. The user interface and/or effects may give the user 202(1) an indication that the call progress is not "hung," e.g., failing to respond to inputs, but rather is continuing to progress. Therefore, premature call terminations may be reduced during the contacting stage, improving user experiences with the communication application 206 and the communication platform 106.

Example User Interfaces

FIGS. 3A-3D illustrate example interfaces usable to present call status effects in accordance with the described techniques. The interfaces and/or the notifications may be generated by a computing device of a communication platform (e.g., communication platform 106) and transmitted to one or more user computing devices (e.g., computing devices 104 and/or the computing devices 204) for presentation, and/or the interfaces may be generated by the one or more user computing devices based at least in part on instructions received from the communication platform. As discussed above, the interfaces described in this section may, but need not, be implemented in the context of the system 100 and/or the system 200, described below.

FIG. 3A illustrates an example in which a first user, such as the user 102(1) of FIG. 1, has sent a request to call a second user, such as the user 102(2), using a communication application such as the communication application 110. A computing device 300 is shown displaying an interface 302(a) corresponding to a call interface that may be presented following a user input by the user 102(1) to call the user 102(2). In this example, the interface 302(a) includes an image 304 of the user 102(2) (e.g., a profile picture of the user 102(2)), a name 306 of the user 102(2), and a call status indicator 308(a) that recites "Contacting." In some examples, the call status indicator 308(a) provides the user 102(1) with an indication that the request to call the user 102(2) is being sent from the computing device 300 to the communication platform 106.

FIG. 3B illustrates an example in which the device 300 has received an indication that the callee (e.g., the user 102(2)) is being contacted, and has received an instruction to display an associated user interface 302(b). In some examples, certain components of the user interface 302(b) remain the same or similar as in the user interface 302(a), such as the image 304 of the user 102(2) and the name 306 of the user 102(2). However, in examples, the computing device 300 may receive instructions from the communication platform 106 to alter one or more components of the user interface, and/or to output one or more effects, associated with a likelihood that the call will connect with the second user 102(2). For instance, the computing device 300 may receive an instruction to display an animation 310(a) surrounding the image 304, and/or to produce a haptic output 312(a) such as a vibration (indicated by dashed lines surrounding the computing device 300). Additionally, in some examples although not explicitly pictured, the computing device 300 may receive an instruction to output a sound associated with the likelihood of the call connecting. In some cases, a call status indicator 308(b) remains the same or similar to the call status indicator 308(a) at this stage, as the user 102(2) is still in the process of being contacted by the communication platform 106.

In some cases, FIG. 3B may alternatively or additionally correspond to a scenario in which the communication platform 106 has determined that there is greater than a threshold likelihood that the caller (e.g., the user 102(1)) will prematurely terminate the call, such as described in relation to FIG. 2. For instance, in response to the determination that the user 102(1) is likely to prematurely terminate the call, the communication platform 106 may output an instruction to the computing device 300 to display the animation 310(a) and produce the haptic output 312(a). In some examples, the animation 310(a) and the haptic output 312(a) may decrease a likelihood that the user 102(1) will prematurely terminate the call, because the user 102(1) may acknowledge that the call is progressing.

FIG. 3C illustrates an example in which the device 300 has received an indication that the call has been connected with callee (e.g., the user 102(2)), and has progressed to a ringing stage. In some examples, certain components of a user interface 302(c) remain the same or similar as in the user interface 302(a) and/or 302(b), such as the image 304 of the user 102(2) and the name 306 of the user 102(2). However, in examples, the computing device 300 may alter one or more components of the user interface, and/or to output one or more effects, associated with a transition to the ringing stage.

For instance, the computing device 300 may display an animation 310(b) surrounding the image 304, and/or produce a haptic output 312(b) such as a vibration (indicated by dashed lines surrounding the computing device 300). In some examples, a call status indicator 308(*c*) is updated to recite "Ringing," to reflect the transition to the ringing stage. Additionally, in some examples although not explicitly pictured, the computing device 300 may receive an instruction to output a sound associated with the call transitioning to the ringing stage (e.g., a ringback tone). In some cases, the animation 310(*b*), the haptic output 312(*b*), and/or a sound output by the device 300 may be different than the animation 310(*a*), the haptic output 312(*a*), or a sound output at the contacting stage, thus giving the user 102(1) an indication of the progression to a different stage of the call.

Figure 3E:
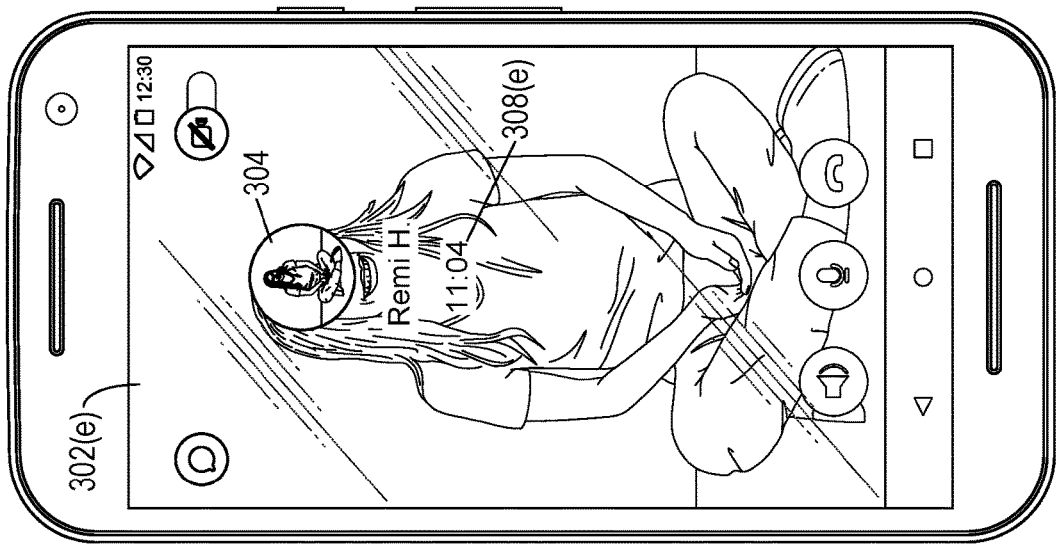
Figure 3D:
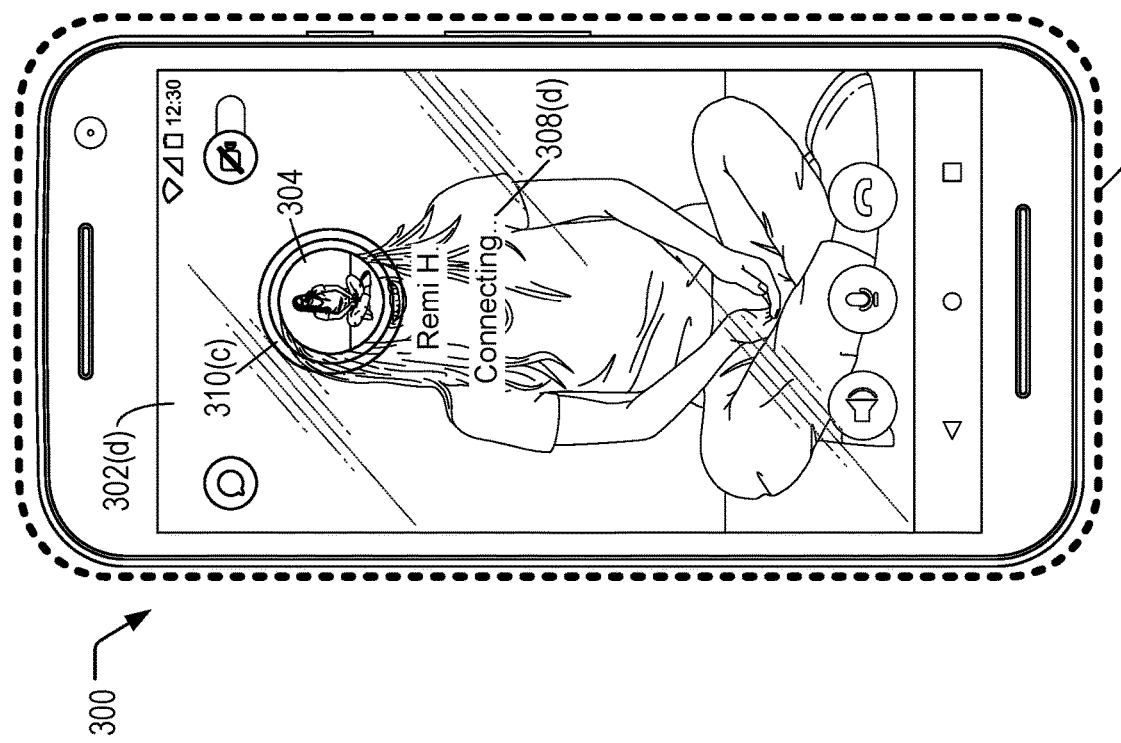

FIG. 3D illustrates an example in which the device 300 has received an indication from the communication platform 106 that the call has been connected with the user account of the user 102(2). In other words, FIG. 3D represents a stage in which the user 102(2) has answered the call, and the device 300 is being connected to a device of the user 102(2) to allow voice and/or video communication between the two devices. In some examples, certain components of a user interface 302(*d*) remain the same or similar as in the user interfaces 302(*a*), 302(*b*), and/or 302(*c*), such as the image 304 of the user 102(2) and the name 306 of the user 102(2). However, in examples, the computing device 300 may alter one or more components of the user interface, and/or to output one or more effects, associated with a transition to the connecting stage.

For instance, the computing device 300 may display an animation 310(*c*) surrounding the image 304, and/or produce a haptic output 312(*c*) such as a vibration (indicated by dashed lines surrounding the computing device 300). In some examples, a call status indicator 308(*d*) is updated to recite "Connecting," to reflect the transition to the connecting stage. Additionally, in some examples although not explicitly pictured, the computing device 300 may receive an instruction to output a sound associated with the call being connected between the two devices. In some cases, the animation 310(*c*), the haptic output 312(*c*), and/or a sound output by the device 300 may be different than the animations 310(*a*) and/or 310(*b*), the haptic outputs 312(*a*) and/or 312(*b*), or a sound output at the contacting or ringing stages, thus giving the user 102(1) an indication of the progression to a different stage of the call.

FIG. 3E illustrates an example including a user interface 302(*e*) displayed by the device 300 during the call with the user 102(2). In some examples, certain components of a user interface 302(*e*) remain the same or similar as in the user interfaces 302(*a*), 302(*b*), 302(*c*), and/or 302(*d*), such as the image 304 of the user 102(2) and the name 306 of the user 102(2). However, in examples, the computing device 300 may alter one or more components of the user interface, and/or to output one or more effects, while the call is connected. For instance, the computing device 300 may display a call status indicator 308(*e*) that reflects an elapsed time of the call. Additionally, in some examples although not explicitly pictured, the computing device 300 may receive an instruction to output a sound and/or a haptic output to indicate a successful connection between the two devices.

Example Methods

Various methods are described with reference to the example systems of FIGS. 1, 2, and 3 for convenience and ease of understanding. However, the methods described are not limited to being performed using the systems of FIGS. 1, 2, and/or 3 and may be implemented using systems and devices other than those described herein.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. Moreover, the methods described herein can be combined in whole or in part with each other or with other methods.

Figure 4:
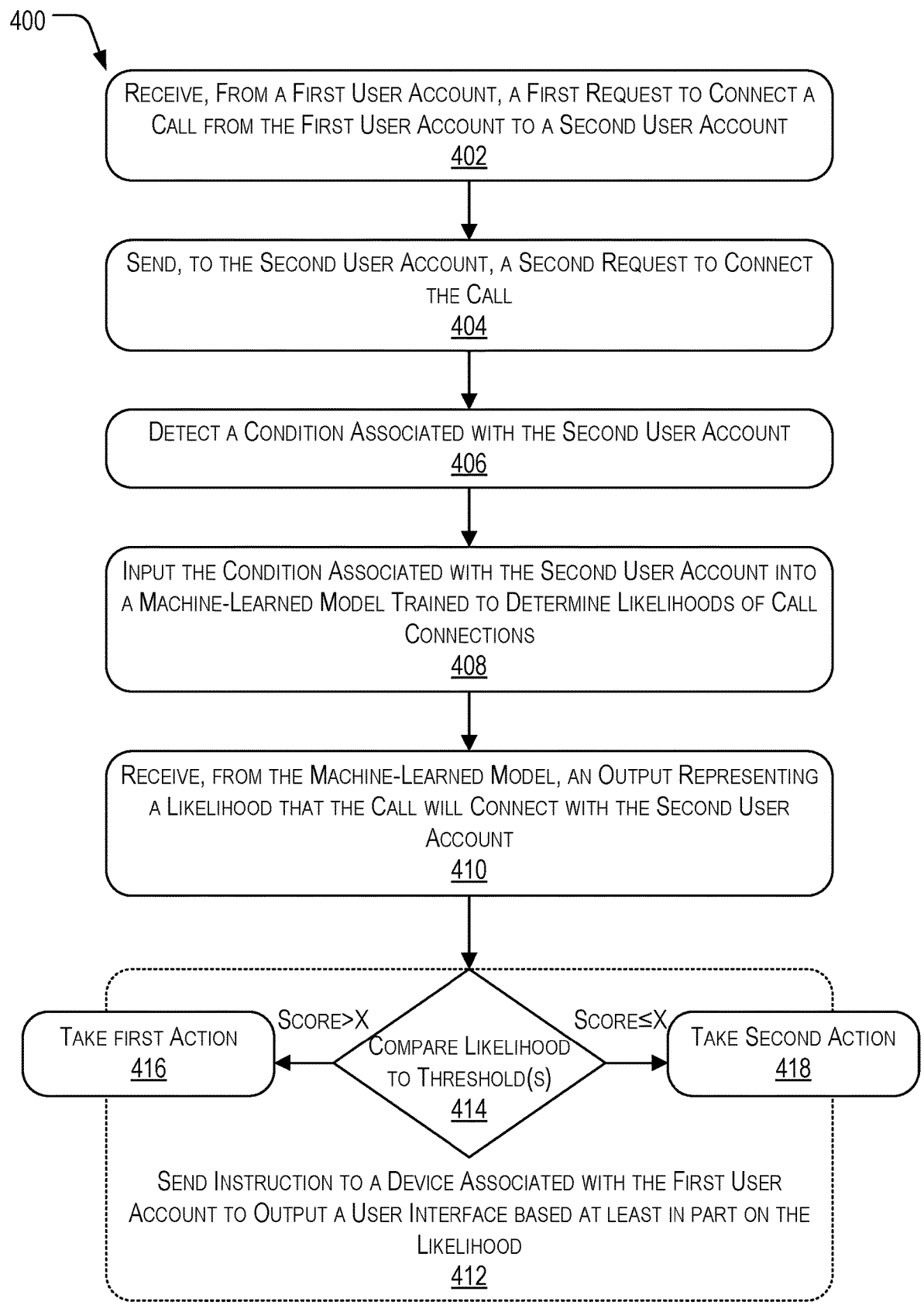
FIG. 4 illustrates an example process for outputting instructions comprising call status effects to a computing device based on a condition associated with the callee.

FIG. 4 illustrates an example process for outputting instructions comprising call status effects to a computing device based on a condition associated with the callee.

At operation 402, the process can include receiving, from a first user account, a first request to connect a call from the first user account to a second user account. For example, the computing device 104(1) may receive a user input by the user 102(1) that indicates a request to connect a call to a user account of the second user 102(2). The communication platform 106 may receive the request from the computing device 104(1), which may include information about the user account of the user 102(2) that the user 102(1) desires to call.

At operation 404, the process can include sending, to the second user account, a second request to connect the call. For instance, the communication platform 106 may identify the user account of the second user 102(2) from the first request, and send the second request to the user account of the second user 102(2) to connect the call.

At operation 406, the process can include detecting a condition associated with the second user account. In some examples, the condition(s) may include one or more of a number of active sessions of the second user account with a communication platform, whether the second user account has a push token enabled for the communication platform, a likelihood that a user associated with the second user account is online, or a time since an interaction was received from the second user account with the communication platform, to name a few examples. Additional examples of conditions associated with the second user account that the communication platform 106 may detect can be found in Table 1, Table 2, and Table 3 above. The communication platform 106 may detect the condition at the time the request is received (e.g., a time since a last interaction with the user device), and/or may store the condition for access when the request is received (e.g., whether the communication application 110 has push notifications enabled).

At operation 408, the process can include inputting the condition associated with the second user account into a machine-learned model trained to determine likelihoods of call connections. For example, the communication platform 106 may input the condition(s) into the call connection model 120 to determine a likelihood of the call being connected. In some cases, the call connection model 120 may comprise a boosted decision tree that outputs a likelihood that a push token is capable of delivering a push notification based on one or more of the conditions included in Table 3. Further, in some examples, the call connection model 120 may comprise a boosted decision tree that outputs a likelihood that the call will connect based on the conditions included in Table 1 and/or Table 2, and may further be based on an output of a likelihood that the push token is capable of delivering a push notification. For instance, at operation 410, the process can include receiving, from the machine-learned model, an output representing a likelihood that the call will connect with the second user account.

At operation 412, the process can include sending an instruction to a device associated with the first user account to output a user interface based at least in part on the likelihood. To determine the instruction, at operation 414 the process can include comparing the likelihood to one or more thresholds. Any suitable threshold likelihood of call connection may be used (e.g., greater than 50%, 75%, 95%, etc.). If the likelihood received from the call connection model 120 is greater than the threshold likelihood, the process may proceed to operation 416, where a first action is taken. For instance, the first action may include the communication platform 106 outputting an instruction to the computing device 104(1) to display an animation in the user interface and/or to output an effect (e.g., sound, haptic, etc.) associated with the call likely being connected to the user account associated with the user 102(2). If the likelihood received from the call connection model 120 is less than or equal to the threshold likelihood, the process may proceed to operation 418, where a second action is taken. For example, the second action may include the communication platform 106 outputting an instruction to the computing device 104(1) to display content in the user interface that the call is unlikely to connect, and give the user 102(1) an opportunity to try the call again later.

Figure 5:
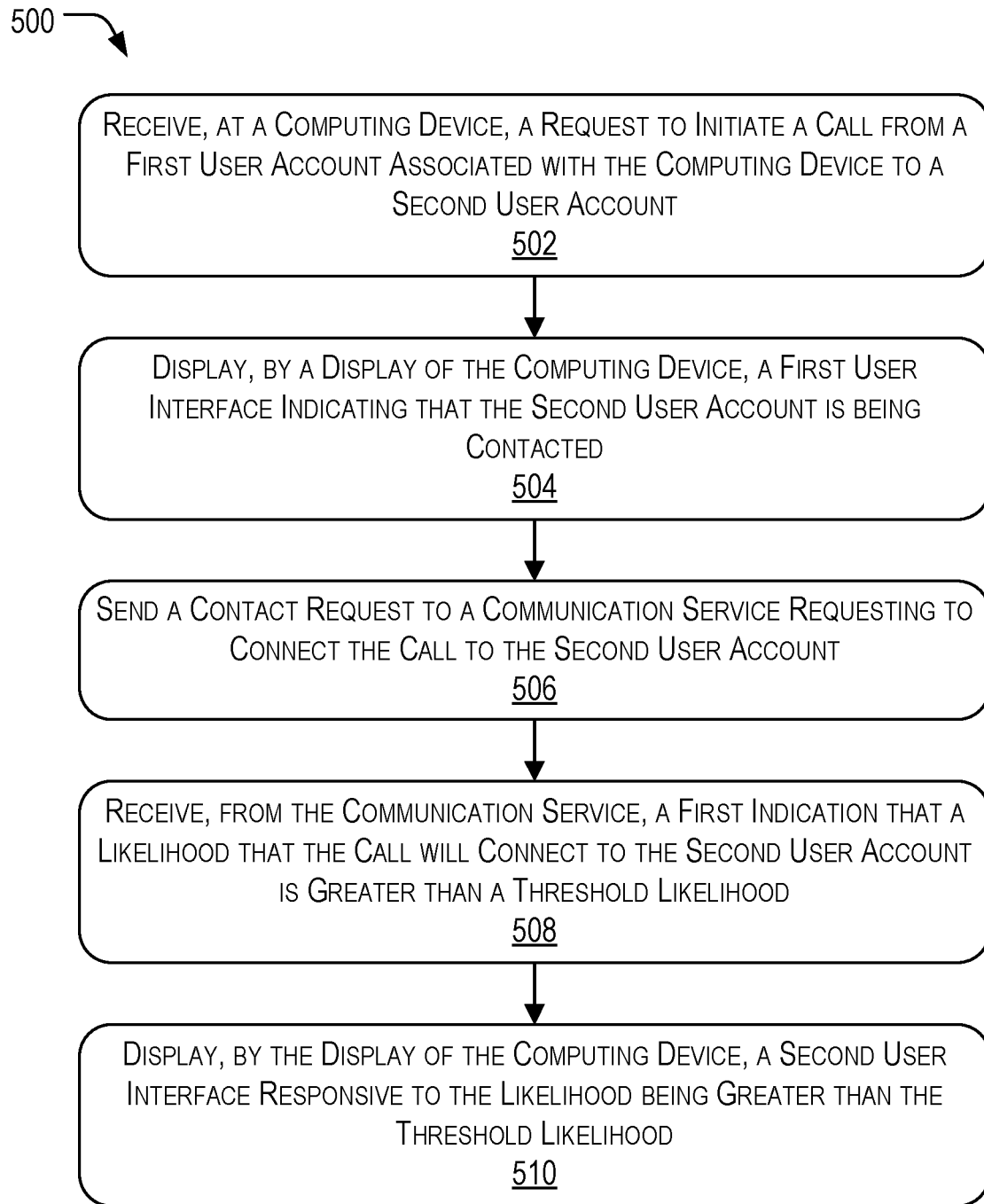
FIG. 5 illustrates an example process for outputting call status effects according to instructions received based on a likelihood that a call will connect.

FIG. 5 illustrates an example process 500 for outputting call status effects according to instructions received based on a likelihood that a call will connect.

At operation 502, the process can include receiving, at a computing device, a request to initiate a call from a first user account to a second user account. For example, the communication application 110 stored on the computing device 104(1) may receive a user input from the user 102(1) to call a user account associated with the user 102(2).

At operation 504, the process can include displaying, by a display of the computing device, a first user interface indicating that the second user account is being contacted. For instance, the computing device 300 may display a user interface such as the user interface 302(a) responsive to the request being received to call to the user account of the second user 102(2).

At operation 506, the process can include sending a contact request to a communication service requesting to connect the call to the second user account. In some examples, the computing device 104(1) may send the contact request to the communication platform 106. The communication platform 106 may use information in the request to begin contacting the second user account for the call, and/or determining a likelihood that the call will connect with the second user account.

At operation 508, the process can include receiving, from the communication service, a first indication that a likelihood that the call will connect to the second user account is greater than a threshold likelihood. For instance, the communication platform 106 may determine one or more conditions associated with the callee (e.g., the user 102(2)), and use the condition(s) to determine a likelihood that the call will connect with the user 102(2). In some examples, the communication platform 106 may determine one or more conditions associated with the caller (e.g., the user 202(1)) to determine a likelihood that the call will be prematurely terminated by the user 202(1). In some cases, the computing device 104(1) may receive instructions to display a user interface and/or output an effect based on the likelihood that the call will connect from the communication service 106 as well.

At operation 510, the process can include displaying, by the display of the computing device, a second user interface responsive to the likelihood being greater than a threshold likelihood. In some examples, the communication platform 106 and/or the computing device 104(1) or 204(1) may compare the likelihood to a threshold likelihood that the call will connect to determine a user interface to display and/or an effect to output. Any suitable threshold likelihood of call connection with the user account of the user 102(2) may be used (e.g., greater than 50%, 75%, 95%, etc.). Further, any suitable threshold likelihood of premature call termination may be used as well (e.g., greater than 10%, 50%, 90%, etc.). For instance, if the call is likely to connect (e.g., greater than the threshold likelihood) and/or is likely to be prematurely terminated by the caller, then the computing device 104(1) or 204(1) may output an animation, effect, or other content to indicate that the call is likely to progress to keep the user 102(1) from prematurely terminating the call.

Figure 6:
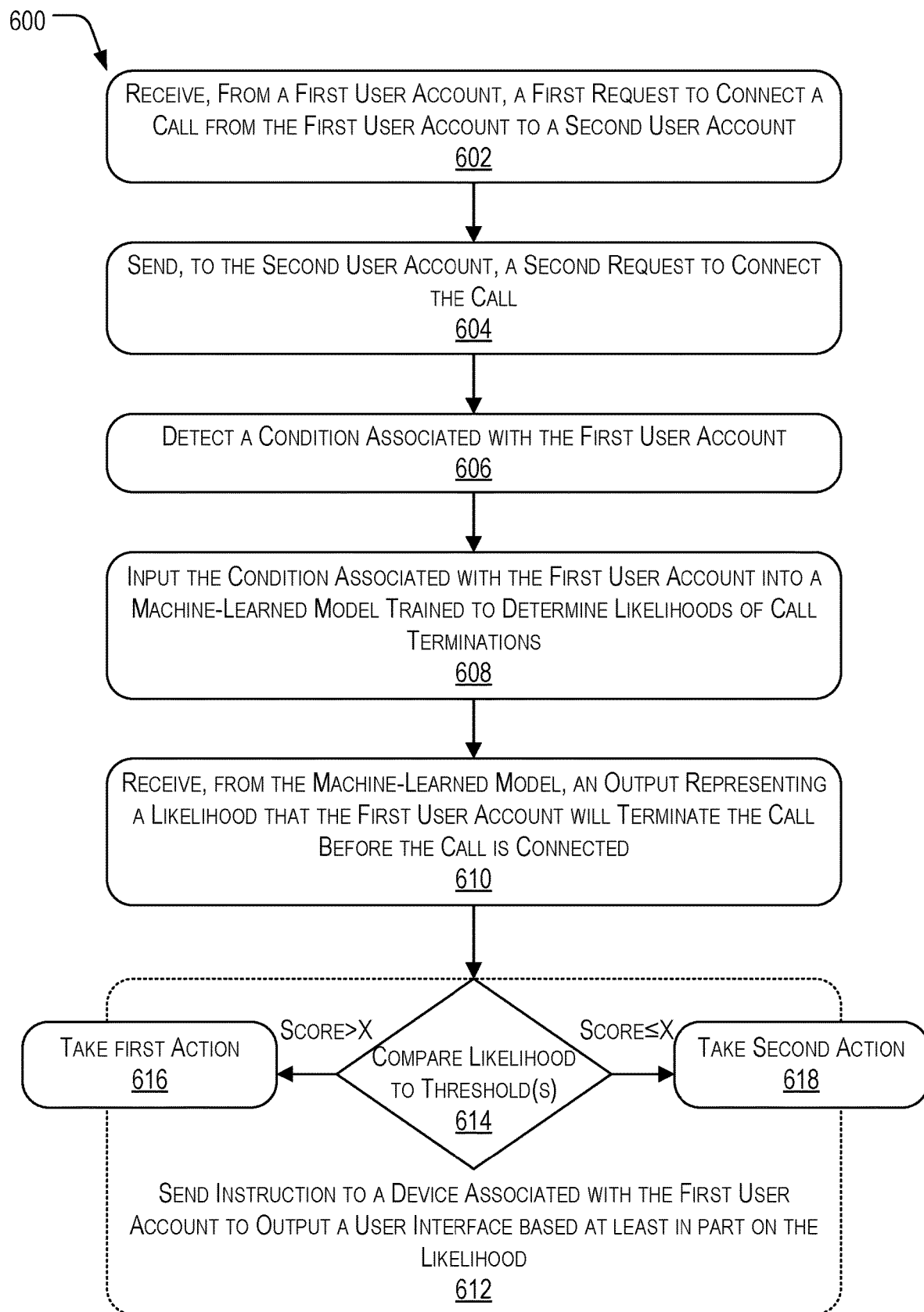
FIG. 6 illustrates an example process for outputting instructions comprising call status effects to a computing device based on a condition associated with the caller.

FIG. 6 illustrates an example process 600 for outputting instructions comprising call status effects to a computing device based on a condition associated with the caller.

At operation 602, the process can include receiving, from a first user account, a first request to connect a call from the first user account to a second user account. Similar to the discussion above, the computing device 204(1) may receive a user input by the user 202(1) that indicates a request to connect a call to a user account of the second user 202(2). The communication platform 106 may receive the request from the computing device 204(1), which may include information about the user account of the user 202(2) that the user 202(1) desires to call.

At operation 604, the process can include sending, to the second user account, a second request to connect the call. For instance, the communication platform 106 may identify the user account of the second user 202(2) from the first request, and send the second request to the user account of the second user 202(2) to connect the call.

At operation 606, the process can include detecting a condition associated with the first user account. In some examples, the condition may relate to a likelihood of that the user 202(1) will prematurely terminate the call. That is, the condition may relate to a likelihood that the user 202(1) will hang up while the call is contacting the user 202(2) and before the call transitions to ringing at both the computing device 204(1) and 204(2). In some examples, prematurely terminating the call may occur at other stages of the call, such as when the call is ringing. In some examples, the condition may include a number of calls that the user account of the user 202(1) has prematurely terminated, an elapsed time after initiating calls that the user account of the user 202(1) prematurely terminated the calls, and so forth.

At operation 608, the process can include inputting the condition associated with the first user account into a machine-learned model trained to determine likelihoods of call terminations. For instance, the communication platform 106 may input the condition(s) into the call connection model 216, and receive a likelihood that the caller will prematurely terminate the call (e.g., a probability that the caller will prematurely terminate the call) from the call connection model 216. In some examples, the call connection model 216 may comprise a boosted decision tree configured to determine the likelihoods of the call terminations by the caller based on one or more conditions associated with a caller user account, e.g., a user account associated with the user 202(1). For instance, at operation 610, the process can include receiving, from the machine-learned model, an output representing a likelihood that the first user account will terminate the call before the call is connected.

At operation 612, the process can include sending an instruction to a device associated with the first user account to output a user interface based at least in part on the likelihood. To determine the instruction, at operation 614 the process can include comparing the likelihood to one or more thresholds. Any suitable threshold likelihood of premature call termination may be used (e.g., greater than 10%, 50%, 90%, etc.). If the likelihood received from the call connection model 216 is greater than the threshold likelihood, the process may proceed to operation 616, where a first action is taken. For instance, the first action may include the communication platform 216 outputting an instruction to the computing device 204(1) to display an animation in the user interface and/or to output an effect (e.g., sound, haptic, etc.) associated with the call likely being prematurely terminated by the user 102(1) by providing the user 102(1) with an indication that the call is progressing to prevent the user from prematurely terminating the call. If the likelihood received from the call connection model 216 is less than or equal to the threshold likelihood, the process may proceed to operation 618, where a second action is taken. For example, the second action may include the communication platform 106 outputting an instruction to the computing device 204(1) to display default content, or content as described in relation to the process 400, in the user interface associated with the call progress.

Example System and Device

Figure 7:
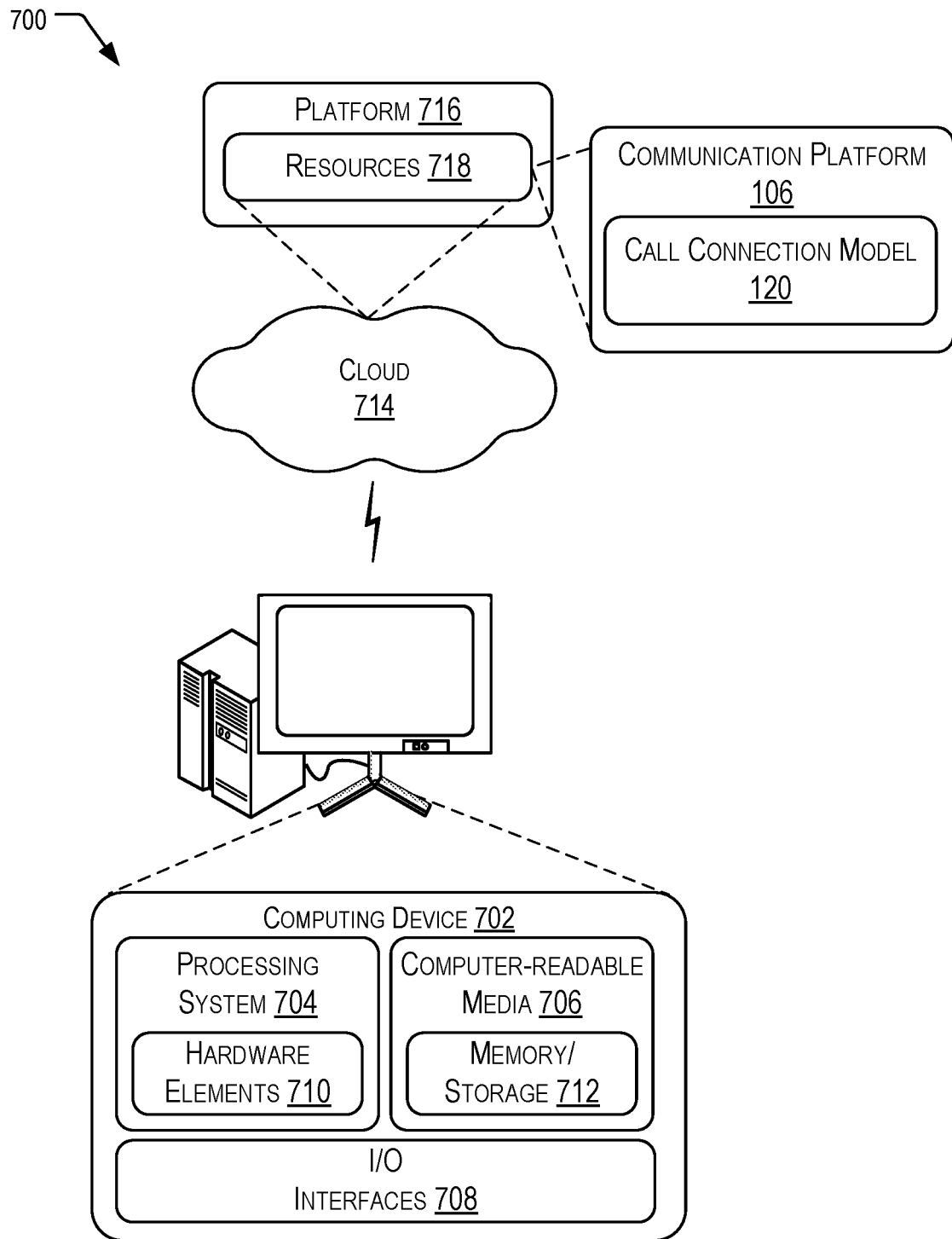
FIG. 7 illustrates an example system and device which may be used to implement the techniques described herein.

FIG. 7 illustrates an example system generally at 700 that includes an example computing device 702 that is representative of one or more computing systems and/or devices that may implement the various techniques described herein. This is illustrated through inclusion of the communication platform 106 and the call connection model 120 configured to determine a likelihood of a call connection and/or premature call termination. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "logic," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on and/or transmitted across some form of computer-readable media. The computer-readable media may include a variety of media that may be accessed by the computing device 702. By way of example, and not limitation, computer-readable media may include "computer-readable storage media" and "computer-readable transmission media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer-readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable transmission media" may refer to a medium that is configured to transmit instructions to the hardware of the computing device 702, such as via a network. Computer-readable transmission media typically may transmit computer-readable instructions, data structures, program modules, or other data in a modulated data signal, such as carrier waves, data signals, or other transport mechanism. Computer-readable transmission media also include any information delivery media. The term "modulated data signal" means a signal that has one or more of its characteristics set or changed in such a manner as to encode information in the signal. By way of example, and not limitation, computer-readable transmission media include wired media such as a wired network or direct-wired connection, and wireless media such as acoustic, radio frequency (RF), infrared, and other wireless media.

As previously described, hardware elements 710 and computer-readable media 706 are representative of modules, programmable device logic and/or device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also be scalable to provide a corresponding level of scale to encountered demand for the resources 718 that are implemented via the platform 716. Accordingly, in an interconnected device embodiment, implementation of functionality described herein may be distributed throughout multiple devices of the system 700. For example, the functionality may be implemented in part on the computing device 702 as well as via the platform 716 which may represent a cloud computing environment 714.

CONCLUSION

Although the discussion above sets forth example implementations of the described techniques, other architectures may be used to implement the described functionality, and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more processors;
   one or more computer-readable storage media storing instructions that, when executed by the one or more processors, cause the system to perform operations comprising:
   receiving, from a first user account, a first request to connect a call from the first user account to a second user account;
   sending, to the second user account, a second request to connect the call;
   detecting a condition associated with the first user account;
   inputting the condition associated with the first user account into a machine-learned model trained to determine likelihoods of call terminations;
   receiving, from the machine-learned model, a likelihood that the first user account will terminate the call before the call is connected;
   determining that the likelihood is greater than a threshold likelihood that the first user account will terminate the call before the call is connected; and
   sending, to a computing device associated with the first user account and responsive to the likelihood being greater than the threshold likelihood, an instruction to display a user interface associated with progress in contacting the second user account.

2. The system of claim 1, wherein the condition comprises a number of calls that the first user account has prematurely terminated or an elapsed time after initiating calls that the first user account prematurely terminated the calls.

3. The system of claim 1, wherein the threshold likelihood is a first threshold likelihood, and wherein content included in the user interface associated with the progress in contacting the second user account is based at least in part on determining that there is at least a second threshold likelihood that the call will be connected to the second user account.

4. The system of claim 1, wherein the instruction to display the user interface comprises an instruction to display an animation associated with the progress in contacting the second user account.

5. The system of claim 1, wherein the instruction is a first instruction, the operations further comprising sending a second instruction to the computing device associated with the first user account to output a sound associated with the progress in contacting the second user account.

6. The system of claim 1, wherein the instruction is a first instruction, the operations further comprising sending a second instruction to the computing device associated with the first user account to output a haptic output associated with the progress in contacting the second user account.

7. A method comprising:
receiving, from a first user account, a first request to connect a call from the first user account to a second user account;
sending, to the second user account, a second request to connect the call;
detecting a condition associated with the first user account;
inputting the condition associated with the first user account into a machine-learned model trained to determine likelihoods of call terminations;
receiving, from the machine-learned model, a likelihood that the first user account will terminate the call before the call is connected;
determining that the likelihood is greater than a threshold likelihood that the first user account will terminate the call before the call is connected; and
sending, to a computing device associated with the first user account and responsive to the likelihood being greater than the threshold likelihood, an instruction to display a user interface associated with progress in contacting the second user account.

8. The method of claim 7, wherein the threshold likelihood is a first threshold likelihood, and wherein content included in the user interface associated with the progress in contacting the second user account is based at least in part on determining whether there is at least a second threshold likelihood that the call will be connected to the second user account.

9. The method of claim 8, further comprising:
determining that a likelihood that the call will be connected is less than the second threshold likelihood that the call will be connected,
wherein the content included in the user interface comprises an indication that the call is unlikely to connect to the second user account.

10. The method of claim 8, further comprising:
determining that a likelihood that the call will be connected is greater than the second threshold likelihood that the call will be connected,
wherein the content included in the user interface comprises an indication that the call is likely to connect to the second user account.

11. The method of claim 10, wherein the indication that the call is likely to connect comprises an animation associated with the progress in contacting the second user account.

12. The method of claim 10, wherein the instruction is a first instruction, the method further comprising sending a second instruction to the computing device associated with the first user account to output a sound associated with the progress in contacting the second user account and associated with the indication that the call is likely to connect to the second user account.

13. The method of claim 10, wherein the instruction is a first instruction, the method further comprising sending a second instruction to the computing device associated with the first user account to output a haptic output associated with the progress in contacting the second user account and associated with the indication that the call is likely to connect to the second user account.

14. The method of claim 7, wherein the condition comprises a number of calls that the first user account has prematurely terminated or an elapsed time after initiating calls that the first user account prematurely terminated the calls.

15. One or more computer-readable media storing instructions which, when executed by one or more processors, perform operations comprising:
receiving, from a first user account, a first request to connect a call from the first user account to a second user account;
sending, to the second user account, a second request to connect the call;
detecting a condition associated with the first user account;
inputting the condition associated with the first user account into a machine-learned model trained to determine likelihoods of call terminations;
receiving, from the machine-learned model, a likelihood that the first user account will terminate the call before the call is connected;
determining that the likelihood is greater than a threshold likelihood that the first user account will terminate the call before the call is connected; and
sending, to a computing device associated with the first user account and responsive to the likelihood being greater than the threshold likelihood, an instruction to display a user interface associated with progress in contacting the second user account.

16. The one or more computer-readable media of claim 15,
wherein the threshold likelihood is a first threshold likelihood, and wherein content included in the user interface associated with the progress in contacting the second user account is based at least in part on determining whether there is at least a second threshold likelihood that the call will be connected to the second user account.

17. The one or more computer-readable media of claim 16, the operations further comprising:
determining that a likelihood that the call will be connected is greater than the second threshold likelihood that the call will be connected,
wherein the content included in the user interface comprises an indication that the call is likely to connect to the second user account.

18. The one or more computer-readable media of claim 17, wherein the indication that the call is likely to connect comprises an animation associated with the progress in contacting the second user account.

19. The one or more computer-readable media of claim 15, wherein the instruction is a first instruction, the operations further comprising sending a second instruction to the computing device associated with the first user account to output a sound associated with the progress in contacting the second user account and associated with the indication that the call is likely to connect to the second user account.

20. The one or more computer-readable media of claim 15, wherein the instruction is a first instruction, the operations further comprising sending a second instruction to the computing device associated with the first user account to output a haptic output associated with the progress in contacting the second user account and associated with the indication that the call is likely to connect to the second user account.

* * * * *